United States Patent
Wang et al.

(10) Patent No.: US 8,502,964 B2
(45) Date of Patent: Aug. 6, 2013

(54) CHAOTIC OPTICAL TIME DOMAIN REFLECTOMETER METHOD AND APPARATUS

(75) Inventors: Yuncai Wang, Taiyuan (CN); Hucheng He, Taiyuan (CN); Bingjie Wang, Taiyuan (CN); Anbang Wang, Taiyuan (CN)

(73) Assignee: Taiyuan University of Technology, Taiyuan (CN)

( * ) Notice: Subject to any disclaimer, the term of this patent is extended or adjusted under 35 U.S.C. 154(b) by 259 days.

(21) Appl. No.: 12/811,920

(22) PCT Filed: Jan. 16, 2009

(86) PCT No.: PCT/CN2009/000058
§ 371 (c)(1),
(2), (4) Date: Jul. 7, 2010

(87) PCT Pub. No.: WO2009/097736
PCT Pub. Date: Aug. 13, 2009

(65) Prior Publication Data
US 2010/0290035 A1     Nov. 18, 2010

(30) Foreign Application Priority Data
Jan. 31, 2008 (CN) .......................... 2008 1 0054534

(51) Int. Cl.
*G01N 21/00* (2006.01)
(52) U.S. Cl.
USPC ........................................ 356/73.1

(58) Field of Classification Search
USPC ......................................... 356/73.1
See application file for complete search history.

(56) References Cited

U.S. PATENT DOCUMENTS
7,920,253 B2 *  4/2011  Cyr et al. ................... 356/73.1

FOREIGN PATENT DOCUMENTS
| CN | 1681227 A | 10/2005 |
| CN | 1831560 A | 9/2006 |
| CN | 1831561 A | 9/2006 |
| CN | 1844951 A | 10/2006 |
| CN | 101226100 A | 7/2008 |

* cited by examiner

*Primary Examiner* — Tu Nguyen
(74) *Attorney, Agent, or Firm* — Novak Druce Connolly Bove + Quigg LLP

(57) ABSTRACT

In a method and a corresponding apparatus for performing chaotic optical time domain reflectometer, the chaotic laser signal, generated by the chaotic laser transmitter, is split into probe signal I and reference signal II by a fiber coupler. Through an optical circulator, the probe signal I is launched into the test fiber and the echo light is converted into electrical signal by a photodetector and digitalized by an A/D converter. The reference signal II is converted into electrical signal by a photodetector and digitalized by another A/D converter. Two digital signals received from two A/D converters are correlated in a signal processing device to locate the exact position of faults in fibers. The result output is then displayed on a display device. This invention was developed to overcome the tradeoff problem between resolution and dynamic range of the pulse-based OTDR.

4 Claims, 4 Drawing Sheets

CHAOTIC OPTICAL TIME DOMAIN REFLECTOMETER METHOD AND APPARATUS

RELATED APPLICATIONS

This application is a national stage application (under 35 U.S.C. §371) of PCT/CN2009/000058, filed Jan. 16, 2009, which claims benefit of People's Republic of China application 200810054534.7, filed Jan. 31, 2008.

FIELD OF THE INVENTION

This invention relates to a method and apparatus for carrying out optical time domain reflectometer, and more particularly to the correlation optical time domain reflectometer in which the chaotic laser is used as the probe signal. More generally, this invention is in the field of monitoring optical transmission line and optical fiber networks.

BACKGROUND OF THE INVENTION

Optical time domain reflectometer (OTDR) is a measuring device based on the backscattered or back-reflected signals. It's the most important tool for locating the fiber faults and estimating the fiber's length and overall attenuation, including splice and mated-connector losses. It can measure fiber by a non-destructive means and has a wide range of application in the field of optical fiber industry like optical fiber research and manufacturing, optical fiber networks installation and maintenance, playing a very important role in the fiber industry.

Normally OTDR comprises four units: the laser generating unit, the laser receiving unit, the signal processing unit and the display unit, in which the first three units are critical parts, representing the core technology of OTDR. The conventional OTDR injects a short optical pulse emitted from a pulse laser to an optical fiber under test. It also extracts, from the same end of the fiber, the optical signal that is backscattered and back-reflected from points in the fiber where the index of refraction changes. The power lever of the return pulses can be measured as a function of time, and the fiber condition is represented as a function of distance.

While the drawback of such an OTDR technique is that its resolution is limited by the width of the optical pulse, which is generated by pulse laser as light source. For example, to achieve a resolution of 100 m, pulse width should be less than 1 µs. The dynamic range of the OTDR depends on the amount of energy that is launched into the fiber and is limited due to the available laser pulse peak power. Increased pulse width reduces the resolution of the pulse-based OTDR. To enhance the dynamic range, the resolution will be reduced accordingly, and vise versa, which has become an inextricable problem for the pulse-based OTDR.

In the related art EP0269448 and JP9026376, an improved correlation OTDR was developed to overcome the tradeoff between resolution and dynamic range of the pulse-based OTDR. In correlation OTDR, light source is acted by a low-power continuous-wave semiconductor laser modulated with pseudorandom code, and the reflection point is located by correlating the backscattered light with a delayed code sequence. By enhancing the total energy of probe light with increasing code length, dynamic range can be enlarged, without losing resolution for given pulse width. This method can improve the dynamic range and spatial resolution significantly. However, fail to make full use of the advantages of the correlation technology; the resolution is still limited by the bandwidth of the electrical codes. The unambiguous detection span is also limited due to the repeat waveform of pseudorandom codes. Also, complex devices, such as pseudorandom codes generator and encoding and modulation circuits, are needed.

SUMMARY OF THE INVENTION

The object of the invention is to provide a method and corresponding apparatus for performing optical time domain reflectometer which overcomes the tradeoff between the dynamic range and spatial resolution in conventional OTDR and avoids the disadvantages caused by the above-mentioned correlation OTDR. This method has merits of high resolution, simple structure and lower cost.

The proposed invention utilizes the chaotic laser signal instead of the optical pulses modulated by the pseudorandom codes in correlation OTDR. The chaotic laser signal is a real random signal and has much higher bandwidth up to tens of GHz which can enhance resolution of the OTDR and reduce "dead zone". And the chaotic laser transmitter is simple and low cost.

In principle, the chaotic laser is divided into probe light I and reference light II. Here, let $f(t)$ and $g(t)$ denote the reference light II and the probe light I back-reflected from the test fiber, respectively. The probe light I $g(t)$ is a time-delayed version of the reference light and can be written as: $g(t)=Kf(t-\tau_0)$ Where $\tau_0$ is the delay time and K is the loss factor. The cross correlation function $I(\tau)$ between $f(t)$ and $g(t)$ is given by: $I(\tau)=K\int_{-\infty}^{+\infty}f(t-\tau)f(t-\tau_0)dt$. The cross correlation function $I(\tau)$ of the chaotic signals is the delta function, i.e., a sharp peak. And at $\tau=\tau_0$, a strong correlation peak appears. The correlation peak amplitude is related to the intensity of the back-reflected probe light. Based on this principle, the intensity of the back-reflected probe light and round trip timer $\tau_0$ in the test fiber can be obtained from the output of the correlator or computer, and fault location and measurement of the optical fiber transmission characteristics is realized.

Such an apparatus for performing the method comprises a chaotic laser transmitter, a fiber coupler, two photodetectors, two A/D converters, a signal processing device and a display device. According to the invention, the chaotic laser signal emitted by the chaotic laser transmitter is split into the probe light I and the reference light II via a fiber coupler. The probe light is injected to the optical fiber under test through the optical circulator. The echo signal is transmitted to the photodetector I which converts the light signal into electrical signal. The electrical signal is digitized by the A/D converter and then supplied to the signal processing section. The reference light II is received by the photodetector II. The converted electrical signal is digitized by the A/D converter II and also supplied to the signal processing section. The signal processing section correlates the two input electrical signals and the result is delivered to a display device, such as a viewing screen or a plotter.

According to the invention, the probe light in chaotic OTDR should be amplified by an optical amplifier before it is launched into the test fiber through an optical circulator.

The above-mentioned chaotic laser transmitter is a chaotic semiconductor laser system or a chaotic fiber laser system. The chaotic laser diode system is a semiconductor laser with external optical feedback or a semiconductor laser connected to another semiconductor laser. The external optical feedback section is a digital reflector or an optical fiber with coated reflective film end or a fiber grating with a variable optical attenuator. The chaotic fiber laser system is a fiber ring laser with an intensity modulator or a fiber double-ring laser. The above-mentioned optical circulator can be replaced by a fiber coupler or a beam splitter and the signal processing section is a digital correlator or a computer.

Such a method about the chaotic OTDR, with characteristic in that is the probe signal is the chaotic laser, the relationship between fiber attenuation and length is obtained by correlating the back-reflected probe signal with the reference signal.

To perform the correlation, the reference signal should undergo a suitable delay with respect to the received reflected probe signal. This delay should be adjustable to adapt to different fiber length and measuring range.

The Invention Provides the Following Advantages:

(1) According to the invention, the chaotic OTDR utilize the chaotic laser as the probe signal and the relationship between fiber loss and fiber distance is obtained by using perfect cross-correlation properties of the chaotic laser, the OTDR based on this method has anti-jamming capability and high noise tolerance.

(2) Compared with prior art, the generation of chaotic laser no longer needs complex devices and techniques, such as costly ultra-short pulse source, pseudorandom codes generator and encoding and modulation circuits. Simple configuration is low cost.

(3) According to the invention, the chaotic OTDR has a higher resolution. High dimension and tens of GHZ bandwidth chaotic laser signal can be generated from a simple semiconductor laser system or fiber laser system, which make the resolution of the OTDR on the order of millimeters scale.

(4) According to the invention, the dynamic range of the chaotic OTDR becomes larger. Compared with the conventional OTDR which use the single pulse as the probe signal, the dynamic range of chaotic OTDR can be easily enlarged without losing resolution since the continuous chaotic laser can enhance the optical output power of probe light, in addition, certain noise is eliminated following the processed signal with correlation technique. Theoretically, this method can detect the distance on millimeter scale and reduce the "dead zone" caused by the pulse width. With the help of high-gained light amplifier and high-accuracy photoelectric detector, the chaotic OTDR could detect the fiber as long as several ten kilometers, more than that, the monitoring range could be larger if different level are cleared and adopted.

(5) According to the invention, the fiber monitoring work becomes more systematic and integrated. With one computer, we can use several chaotic OTDRs to monitor more than one point.

Other features and advantages may be apparent from the following detailed description, the accompanying drawings and the claims.

Figure 1:
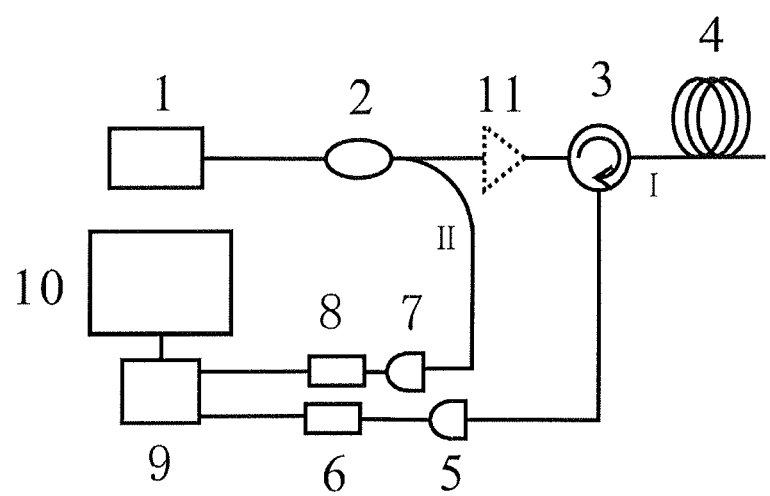
FIG. 1 is a block diagram to show one embodiment of the invention.

The device in drawings:
(1) chaotic laser transmitter
(2) fiber coupler I
(3) optical circulator
(4) test fiber
(5) photodetector I
(6) A/D converter I
(7) photodetector II
(8) A/D converter II
(9) signal processing device
(10) display device
(11) optical amplifier
(12) semiconductor laser I
(13) fiber coupler II
(14) optical feedback section
(15) semiconductor laser II
(16) wavelength division multiplexer I
(17) optical isolator
(18) erbium-doped fiber I
(19) fiber coupler III
(20) fiber coupler IV
(21) erbium-doped fiber II
(22) semiconductor pump laser III
(23) 23. wavelength division multiplexer II

DETAILED DESCRIPTION OF THE PREFERRED EMBODIMENT

Detailed descriptions will now be made to an embodiment of the present invention based on the drawings.

Embodiment One

FIG. 1 schematically depicts a chaotic OTDR according to the invention. The chaotic OTDR mainly comprises a chaotic laser transmitter 1, a fiber coupler 2, an optical circulator 3, two photodetectors 5, 7, two A/D converters 6, 8, a signal processing device 9 and a display device 10.

Figure 2:
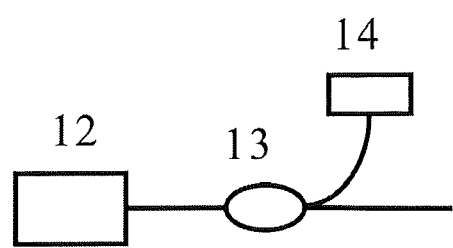
FIG. 2 is a block diagram of the embodiment of the chaotic laser transmitter of the apparatus shown in FIG. 1.

Further details of the chaotic laser transmitter 1 are explained below with reference to FIG. 2. The chaotic laser transmitter 1 is formed of a semiconductor laser 12, a fiber coupler 13, and a feedback section 14. The feedback section 14 is a digital reflector or an optical fiber with coated reflective film end or a fiber grating connected to a variable optical attenuator. In a semiconductor laser 12 with optical feedback, complex high dimensional chaotic output can be obtained by adjusting the controllable operational parameters of the feedback device 14. Alternatively, the feedback device 14 can be replaced by another semiconductor laser which is used as an injection laser, the chaotic laser signal can output from the semiconductor laser 12 injected by another semiconductor laser.

Figure 3:
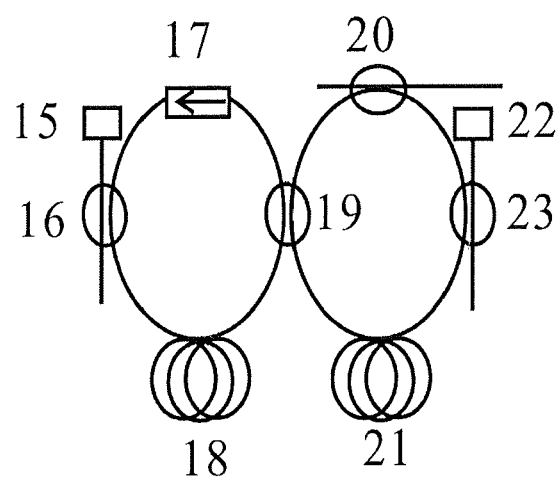
FIG. 3 is block diagram of another embodiment of the chaotic laser transmitter of the apparatus shown in FIG. 1.

To realize the chaotic laser transmitter 1, a different configuration of a fiber double-ring laser can also be utilized. As shown in FIG. 3, one ring cavity comprises of a wavelength division multiplexer 16, an optical isolator 17, an erbium-doped fiber 18, and a fiber coupler 19. Another ring cavity comprises of a fiber coupler 19, a fiber coupler 20, an erbium-doped fiber 21, and a wavelength division multiplexer 23. Two ring cavities are coupled by the fiber coupler 19. Here two semiconductor lasers 15, 16 with 980 nm wavelength are chosen to pump the erbium-doped fibers 18 and 19. Alternatively, the chaotic laser signal can also be emitted under the proper condition by adding an intensity modulator in only a single ring cavity which comprises of a wavelength division multiplexer 16, an optical isolator 17, an erbium-doped fiber 18, and a fiber coupler 19 and the other ring cavity is removed.

The chaotic laser signal emitted by the chaotic laser transmitter 1 is split into the probe signal I and the reference signal II via a fiber coupler 2. The probe signal I is transmitted through an optical circulator 3 and is coupled into an optical fiber under test 4. Here a fiber with open-end is used to simulate the break fault. The back reflected probe signal is transmitted to a photodetector 5 which converts the optical signal into electrical signal. The electrical signal is digitized by an ND converter 6 and then supplied to a signal processing device 9. The reference optical signal II is converted into the electrical signal by a photodetector 7 and digitized by an A/D converter 8. The digital reference signal is also received by the signal processing device 9. The power of the probe signal I can be amplified by an optical amplifier 11 to improve the dynamic range of the chaotic OTDR. The optical amplifier 11 may be an erbium-doped fiber amplifier or a semiconductor optical amplifier. The signal processing device 9 is a digital correlator or a computer.

Embodiment Two

FIG. 1 also depicts the correlation method of the chaotic OTDR and further details are explained below. The chaotic laser signal emitted by the chaotic laser transmitter 1 is split into the probe signal I and the reference signal II. The back reflected probe signal I g(t) is a time-delayed version of the reference signal II f(x) and can be written as: $g(t)=Kf(t-\tau_0)$. Here $\tau_0$ is the delay time and K is the loss factor. The back reflected probe signal I g(t) and the delayed reference signal II f(x−τ) are provided to the signal processing device 9 that realizes fault location of the test fiber by correlating two received signals. The result output is then displayed on a display device 10. The cross correlation function I(τ) between f(x) and g(t) is given by:

$$I(\tau)=K\int_{-\infty}^{+\infty}f(t-\tau)f(t-\tau_0)dt$$

Figure 4:
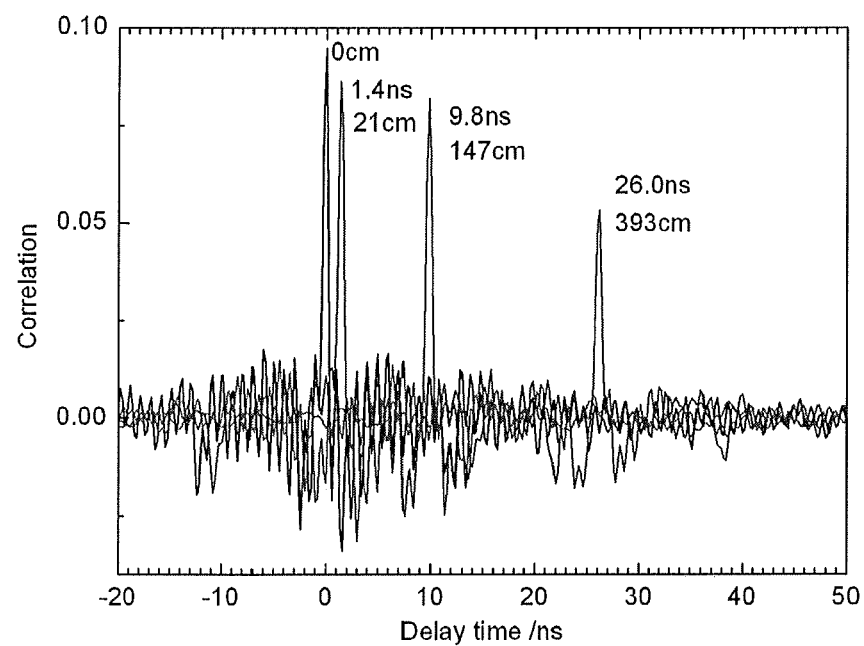
FIG. 4 is a drawing to show the cross correlation traces of the chaotic laser signals.

From the position of peak of the correlation trace, the fault is located. FIG. 4 shows the cross-correlation traces, which are obtained by correlating the reference signal f(x) with the back-reflected probe signals g(t) from several open-ended fibers with different lengths. The spatial resolution is 6 cm.

The delay time $\tau_0$ between the reference signal and the reflected probe signal is large when measuring the long-haul fiber. The resolution becomes low due to longer data collection points. To perform the correlation, the reference signal should undergo a suitable delay with respect to the received reflected probe signal, so as to ensure a high resolution will be obtained in measuring the long-haul fiber. This delay should be adjustable to adapt to different fiber length and measuring range.

What is claimed is:

1. A chaotic optical time domain reflectometer comprising:
   a chaotic laser transmitter which emit a chaotic laser signal to one end of an optical fiber as a target to be tested;
   a fiber coupler which divides the chaotic laser signal into the probe signal I and the reference signal II, wherein the probe optical signal I is amplified by an optical amplifier (11), and then is launched into the test fiber (4) through an optical circulator (3);
   two photodetectors which separately convert the backscattered probe optical signal and the reference optical signal into electrical signals;
   two A/D converters which separately convert electrical signals from two photodetectors into digital signals;
   a signal processing device which correlates the probe signal with the reference signal;
   a display device which displays the measuring results generated by the signal processing device;
   wherein the chaotic laser signal, generated by the chaotic laser transmitter (1), is split into the probe signal I and the reference signal II by a fiber coupler (2), wherein the chaotic laser transmitter (1) is a chaotic semiconductor laser, wherein the chaotic semiconductor laser further comprising a semiconductor laser with an external optical feedback section (12) or a semiconductor laser injected by another semiconductor laser, and wherein the external optical feedback section (12) is a digital reflector or an optical fiber with coated reflective film end or a fiber grating connected to a variable optical attenuator;
   through an optical circulator (3), the probe signal I is launched into the test fiber (4) and the back-reflected probe optical signal I is converted into the electrical signal by a photodetector (5) and digitized by an A/D converter (6);
   the reference optical signal II is converted into the electrical signal by a photodetector (7) and digitized by an A/D converter (8);
   two digital signals from two A/D converters (6) (8) are correlated by a signal processing device (9), the result output is displayed on a display device (10) wherein the signal processing device (9) is a digital correlator or a computer.

2. A method of carrying out chaotic optical time domain reflectometer as in claim 1, comprising steps of:
   applying a chaotic laser signal to the optical fiber under test;
   splitting the chaotic laser signal into the reference signal and the probe signal;
   launching the probe signal into the optical fiber under test; and
   correlating the back reflected probe signal from the test fiber with the reference signal and locating the faults, wherein the reference signal undergoes a suitable delay with respect to the received reflected probe signal; where the delay is adjustable to adapt to different fiber length and measuring range.

3. A chaotic optical time domain reflectometer comprising:
   a chaotic laser transmitter which emit a chaotic laser signal to one end of an optical fiber as a target to be tested, wherein the chaotic laser transmitter is a chaotic semiconductor laser, wherein the chaotic semiconductor laser further comprising a semiconductor laser with an external optical feedback section (12) or a semiconductor laser injected by another semiconductor laser, and wherein the external optical feedback section (12) is a digital reflector or an optical fiber with coated reflective film end or a fiber grating connected to a variable optical attenuator;
   a fiber coupler which divides the chaotic laser signal into the probe signal I and the reference signal II, wherein the probe optical signal I is amplified by an optical amplifier (11), and then is launched into the test fiber (4) through an optical circulator (3);
   two photodetectors which separately convert the backscattered probe optical signal and the reference optical signal into electrical signals;
   two A/D converters which separately convert electrical signals from two photodetectors into digital signals;
   a signal processing device which correlates the probe signal with the reference signal;
   a display device which displays the measuring results generated by the signal processing device, wherein the signal processing device (9) is a digital correlator or a computer.

4. A method of carrying out chaotic optical time domain reflectometer as in claim 3, comprising steps of:
   applying a chaotic laser signal to the optical fiber under test;

splitting the chaotic laser signal into the reference signal and the probe signal;

launching the probe signal into the optical fiber under test; and correlating the back reflected probe signal from the test fiber with the reference signal and locating the faults, wherein the reference signal undergoes a suitable delay with respect to the received reflected probe signal; where the delay is adjustable to adapt to different fiber length and measuring range.

* * * * *